UNITED STATES PATENT OFFICE.

CARL WALTER VOLNEY, OF TOMS RIVER, NEW JERSEY.

EXPLOSIVE COMPOUND.

SPECIFICATION forming part of Letters Patent No. 366,281, dated July 12, 1887.

Application filed September 14, 1885. Serial No. 176,935. (No specimens.)

*To all whom it may concern:*

Be it known that I, CARL WALTER VOLNEY, a citizen of the United States, residing at Toms River, in the county of Ocean and State of New Jersey, have invented certain new and useful Improvements in Explosive Compounds; and I do hereby declare that the following is a full, clear, and exact description of the invention, which will enable others skilled in the art to which it appertains to make and use the same.

The main feature of my invention consists in the use of a gelatinous mass obtained by dissolving nitro-starch in nitro-glycerine. The nitro-starch I prepare in the following manner: Starch is pulverized and dried, and then gradually stirred into a mixture of strong nitric and sulphuric acids, which is kept cool during the operation. Nitro starch separates in granulated masses, which are removed from the acid, well washed, so as to remove all traces of adhering acid, dried, and pulverized. The nitro-starch thus prepared is gradually dissolved in nitro-glycerine, which is kept at a temperature of 35° centigrade, and, according to the quantities used of each, gelatinous substances of different degrees of consistence can be obtained. This is an important feature in the manufacture of high-explosive blasting-powder, as by means of the great dissolving power of nitro-glycerine for the nitro-starch prepared in the above manner an almost solid nitro-glycerine compound can be produced, whereby any leaking or separating of the nitro-glycerine from the other ingredients may be made impossible, as it is not contained therein in a free or liquid state. It is now only necessary to incorporate enough of an oxidant—such as nitrates and chlorates—into the gelatinous substance to procure a perfect combustion in the explosion of the compound. This will depend upon the constituent parts or their relative proportion of the gelatinous mass. As a general example, I give the following proportions for a good blasting-powder: Thirty-five pounds of nitro-starch are dissolved in sixty-five pounds of nitro glycerine, and in this solution are incorporated forty pounds of sodium nitrate.

Patents have been granted to Alfred Nobel, Carl Dittmar, and others for explosive compounds containing gun-cotton, xyloidine, and other substances. I do not claim these as my invention, or any part thereof.

Having described my invention, what I desire to claim, and secure by Letters Patent, is—

1. The explosive compound consisting of nitro-starch dissolved in nitro-glycerine and oxidants, as chlorates and nitrates.

2. As a new article of manufacture, the solution of nitro-starch in nitro-glycerine.

CARL WALTER VOLNEY.

Witnesses:
HENRY STANSFIELD,
CHAS. W. POTTER.